US010704694B2

(12) United States Patent
Hofstetter et al.

(10) Patent No.: US 10,704,694 B2
(45) Date of Patent: Jul. 7, 2020

(54) ROTARY VALVE HAVING A SLIDING SEAL

(71) Applicant: Magna Powertrain Bad Homburg GmbH, Bad Homburg (DE)

(72) Inventors: Hannes Hofstetter, Waidhofen a.d. Thaya (AT); Viktor Racz, St. Valentin (AT)

(73) Assignee: MAGNA POWERTRAIN BAD HOMBURG GMBH, Bad Homburg (DE)

( * ) Notice: Subject to any disclaimer, the term of this patent is extended or adjusted under 35 U.S.C. 154(b) by 0 days.

(21) Appl. No.: 16/050,027

(22) Filed: Jul. 31, 2018

(65) Prior Publication Data

US 2019/0049021 A1   Feb. 14, 2019

(30) Foreign Application Priority Data

Aug. 8, 2017   (DE) .......................... 10 2017 213 795

(51) Int. Cl.
*F16K 5/04* (2006.01)
*F16K 5/18* (2006.01)
*F16K 11/085* (2006.01)
*F16K 5/08* (2006.01)

(52) U.S. Cl.
CPC .......... *F16K 5/0464* (2013.01); *F16K 5/0457* (2013.01); *F16K 5/08* (2013.01); *F16K 5/181* (2013.01); *F16K 11/085* (2013.01)

(58) Field of Classification Search
CPC ...... F16K 5/0464; F16K 5/181; F16K 11/085; F16K 5/08; F16K 5/0457; F16K 5/0673; F16K 5/0678; F16K 5/0471

USPC ....... 251/309–312, 315.01–315.16, 314–317
See application file for complete search history.

(56) References Cited

U.S. PATENT DOCUMENTS

| | | | | |
|---|---|---|---|---|
| 2,373,628 A | * | 4/1945 | Gleeson | ................ F16K 5/0678 251/315.01 |
| 2,943,838 A | * | 7/1960 | Skei | ...................... F16K 5/0471 251/317 |
| 3,357,679 A | * | 12/1967 | Gulick | .................. F16K 5/0673 251/172 |

(Continued)

FOREIGN PATENT DOCUMENTS

| | | |
|---|---|---|
| CN | 102562816 A | 7/2012 |
| DE | 202015100400 U1 | 5/2016 |

(Continued)

OTHER PUBLICATIONS

Holzwarth-Rochford, Jun. 2016, DE 202015100400 U1 English Translation.*

(Continued)

*Primary Examiner* — John Bastianelli
(74) *Attorney, Agent, or Firm* — Dickinson Wright PLLC

(57) ABSTRACT

A rotary valve comprising a housing with a valve chamber, wherein the valve chamber has at least one inlet and at least one outlet, wherein the inlet and/or the outlet are at least partially closable, as required, by a valve body which is rotatable about an axis and is arranged in the valve chamber, wherein, on that side of the housing facing the valve body, the inlet and/or the outlet is enclosed by a sliding seal, and wherein the sliding seal bears sealingly, under elastic pre-load, against that surface of the valve body facing the housing.

12 Claims, 3 Drawing Sheets

(56) References Cited

U.S. PATENT DOCUMENTS

| | | | | |
|---|---|---|---|---|
| 3,397,861 A | * | 8/1968 | Scaramucci | F16K 5/0673 |
| | | | | 251/175 |
| 3,445,087 A | * | 5/1969 | Davies | F16K 5/0636 |
| | | | | 251/172 |
| 3,572,382 A | * | 3/1971 | Luthe | F16K 39/022 |
| | | | | 137/625.35 |
| 3,584,641 A | | 6/1971 | Milleville et al. | |
| 3,610,575 A | * | 10/1971 | Yoneda | F16K 5/0673 |
| | | | | 251/315.05 |
| 4,254,793 A | * | 3/1981 | Scaramucci | F16K 5/0673 |
| | | | | 137/246.22 |
| 4,552,335 A | * | 11/1985 | Alexander | F16K 5/0673 |
| | | | | 251/315.05 |
| 4,579,147 A | * | 4/1986 | Davies | B63C 11/08 |
| | | | | 137/854 |
| 5,419,532 A | * | 5/1995 | Fan | F16K 5/0673 |
| | | | | 251/315.08 |
| 2011/0133109 A1 | * | 6/2011 | Mircea | F16K 5/0673 |
| | | | | 251/315.01 |

FOREIGN PATENT DOCUMENTS

| | | |
|---|---|---|
| DE | 102016220876 A1 | 4/2018 |
| EP | 1318337 B1 | 10/2005 |
| EP | 2213850 A1 | 8/2010 |
| WO | 2014184093 A1 | 11/2014 |

OTHER PUBLICATIONS

Search Report dated May 4, 2018 in corresponding German Patent Application No. 10 2017 213 795.9.

* cited by examiner

ROTARY VALVE HAVING A SLIDING SEAL

CROSS-REFERENCE TO RELATED APPLICATIONS

This application claims the benefit and priority of German Patent Application No. DE 10 2017 213 795.9, filed Aug. 8, 2017. The entire disclosure of the above application is incorporated herein by reference.

FIELD

The present disclosure relates to a rotary valve, comprising a housing with a valve chamber, wherein the valve chamber has at least one inlet and at least one outlet, wherein the inlet and/or the outlet are at least partially closable, as required, by a valve body which is rotatable about an axis and is arranged in the valve chamber, wherein, on that side of the housing facing the valve body, the inlet and/or the outlet is enclosed by a sliding seal, and wherein the sliding seal bears sealingly, under elastic preload, against that surface of the valve body facing the housing.

BACKGROUND

This section provides background information related to the present disclosure which is not necessarily prior art.

Within motor vehicles, rotary valves serve, for example, for the control of the coolant flow. A cylindrical valve body (a rotary slide) which is mounted rotatably in a valve housing regulates the throughflow. To this end, the valve housing has at least one opening, for example as an inflow, an inlet duct, and a control opening arranged in the shell of the cylindrical valve body and which corresponds with the housing opening depending on the pivoting position of the cylinder; as a result, the throughflow is controlled. The region of the housing opening has to be sealed with respect to the valve body, since there are otherwise leaks and liquid escapes. To this end, sealing bushes which slide on the valve body are used, with such sealing bushes being pressed against the valve body under spring force.

WO 2014/184093 A1 has disclosed a rotary valve which has an annular seal body which has a side which is assigned to the cylindrical valve body and bears slidingly against the surface of the valve body, the seal body being inserted into an opening of the housing which receives the valve body, the seal body being pressed against the valve body by way of an elastic force, and the seal body being mounted in the opening which receives it such that it can be moved in the direction of the valve body.

The seal body is pressed against the valve body by means of a spring (a spring element). The spring (the spring element) is arranged so as to surround the annular sealing body. The spring is preferably a spiral spring which, in the form of a plurality of windings, presses the sealing body against the valve body in a manner which surrounds said sealing body. The spring (the spring element) can act on the sealing element, in particular, via an extension edge of said sealing element, and can press the seal (the seal element) against the valve body.

EP 2 213 850 A1 has disclosed a seal arrangement for a rotary slide, having a cross section adjusting member with a circumferential face which has at least one through opening, and having at least one tube section which adjoins the cross section adjusting member and has an inlet which can be brought into at least partial congruence with the through opening by way of a rotation of the cross section adjusting member about a rotational axis, a first sealing element, a second sealing element and a prestressing device which form a throughflow duct for a fluid being arranged along the axial extent of the tube section, the first sealing element bearing sealingly against the circumferential face of the cross section adjusting member, and the second sealing element being of elastic configuration and being arranged between the first sealing element and the prestressing device.

In EP 1 318 337 B1, a regulating valve is provided, in the case of which the seal can be assembled into the housing from that side of the housing which faces away from the rotary slide. It is advantageous here that the regulating valve can be mounted very simply overall, and that the seal can be replaced as required without great repair complexity. The assembly of the seal takes place in such a way that the seal is pressed into the receiving bore of the housing which is provided for this purpose from that side of the housing which faces away from the rotary slide. Here, the housing and the rotary slide which is arranged in the valve chamber of the housing can already be assembled with one another and can form a unit which can be preassembled as a result. The seal is pushed into the corresponding receiving bore of the housing axially in the direction of the rotary slide from the outside, until it makes sealing contact with the outer circumferential-side surface of the rotary slide which is to be sealed under elastic prestress.

Sliding seals are required in all embodiments, in order to seal the rotary valves on the circumference. Only small leakage quantities are permitted for the different functions of the valves, for example in the engine cooling circuit.

DE202015100400 U1 has disclosed a seal which consists of three different materials which form different regions.

SUMMARY

This section provides a general summary of the disclosure, and is not a comprehensive disclosure of its full scope or all of its features.

It is an object of the present disclosure to provide an improved regulating valve which produces the desired sealing effect but is also optimized in terms of wear and frictional moment.

The object of the present disclosure is directed to a rotary valve, comprising a housing with a valve chamber, wherein the valve chamber has at least one inlet and at least one outlet, wherein the inlet and/or the outlet are at least partially closable, as required, by a valve body which is rotatable about an axis and is arranged in the valve chamber, wherein, on that side of the housing facing the valve body, the inlet and/or the outlet is enclosed by a sliding seal, wherein the sliding seal bears sealingly, under elastic preload, against that surface of the valve body facing the housing, and wherein the sliding seal includes a sealing part and a moulded part, wherein the moulded part has sealing regions of different stiffness, and the sealing regions have different annular widths.

In particular, the object is achieved by way of a rotary valve, comprising a housing with a valve chamber, wherein the valve chamber has at least one inlet and at least one outlet, wherein the inlet and/or the outlet are at least partially closable, as required, by a valve body which is rotatable about an axis and is arranged in the valve chamber, wherein, on that side of the housing facing the valve body, the inlet and/or the outlet is enclosed by a sliding seal, and wherein the sliding seal bears sealingly, under elastic preload, against that surface of the valve body facing the housing, wherein the sliding seal consists of a sealing part and a moulded part, wherein the moulded part has sealing regions of different stiffness. In order to transmit a uniformly acting preload force, the bearing faces of the sealing regions are optimized by way of different annular widths.

This structure prevents the sliding seal from hooking into the opening of the valve body, the sliding seal being in contact in an effective and sealing manner.

It is advantageous that at least one sealing region has stiffening ribs, and the different regions of stiffness are produced in this way.

The stiffening ribs are matched to the running height of the moulded part, with the result that the moulded part is reinforced in an optimum manner.

The sealing region with the stiffening ribs also has the largest width.

In order to prevent the sliding seal from becoming caught, the sealing region of low stiffness or highest elasticity has a chamfer.

The moulded part advantageously comprises a spring in a U-shaped groove.

The sliding seal can be produced by plastics injection moulding from at least two plastics of different stiffness.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The invention will be described in the following text by way of example with reference to the appended drawings, in which.

Figure 6:
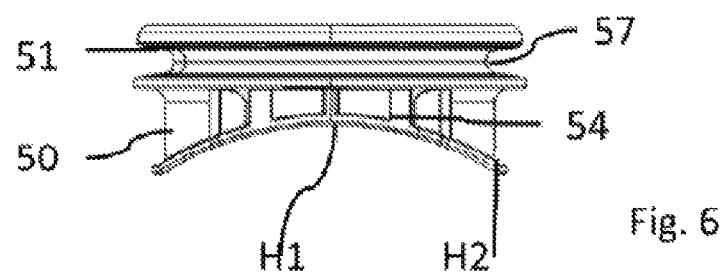
Figure 7:
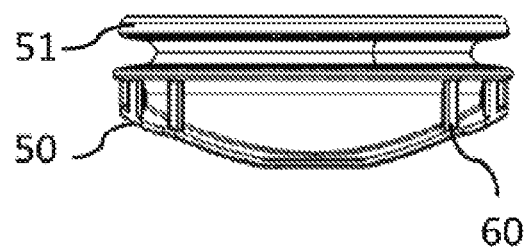

FIGS. 6 and 7 in each case show a section through the sliding seal.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
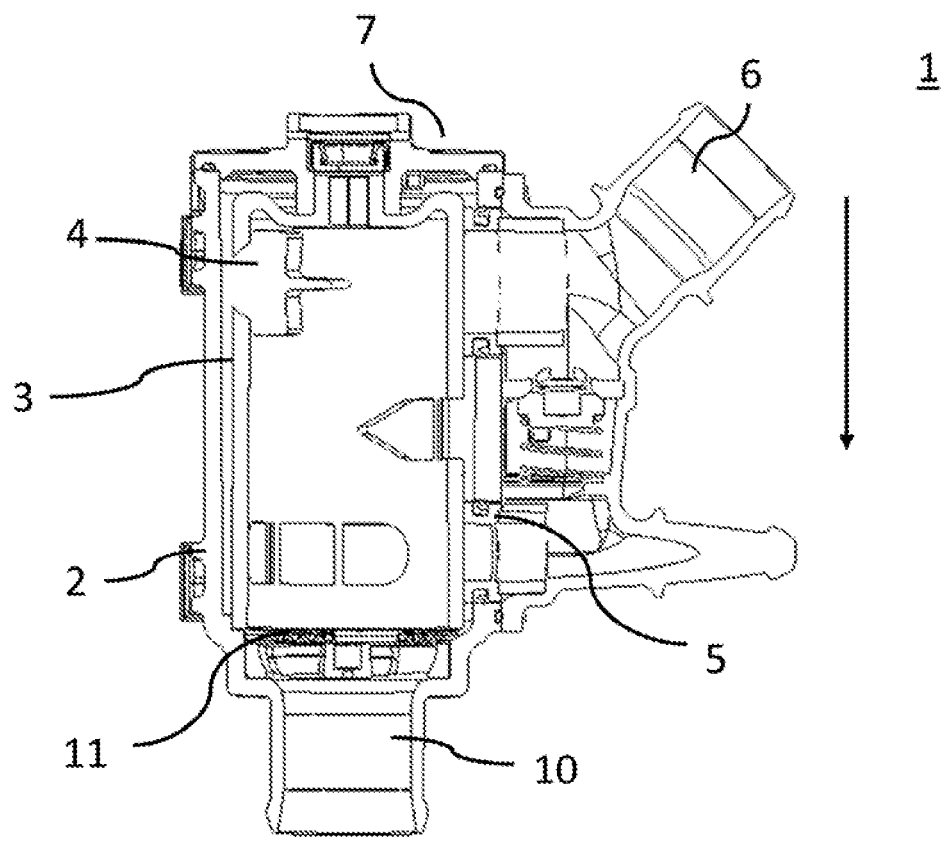
FIG. 1 shows a diagrammatic illustration of an exemplary rotary valve.

FIG. 1 shows a section through a rotary valve 1 having a housing 2 which surrounds a cylindrical valve body 3. In its outer circumference, the valve body 3 of tubular or cup-shaped design has openings 4 which interact with inflows or outflows 6 which are sealed via sliding seals 5 in a manner which bears against the cylindrical outer circumference of the valve body. In its inner region, the housing 2 is likewise of tubular or cylindrical design and then surrounds the valve body 3 which is received and is mounted rotatably, a gap being formed between the outer circumference of the valve body 3 and the inner wall of the housing 2. The valve housing 2 is closed by way of a cover 7 on the upper side. The cover 7 has an opening, through which a shaft which pivots the valve body 3 and is coupled to a drive (not shown) is guided.

The direction of the fluid flow is indicated by way of the arrow. The fluid leaves the valve (the valve housing 3) on its lower side via an outflow 10. The cup-shaped valve body 3 is inserted with the bottom part pointing upwards into the receptacle of the valve housing 2. The open lower side of the valve body 3 lies on a collar-shaped tapered portion within the housing. The said tapered portion has apertures 11, with the result that the fluid flows both within the valve body 3 and in the gap-shaped region outside the valve body 3.

Figure 2:
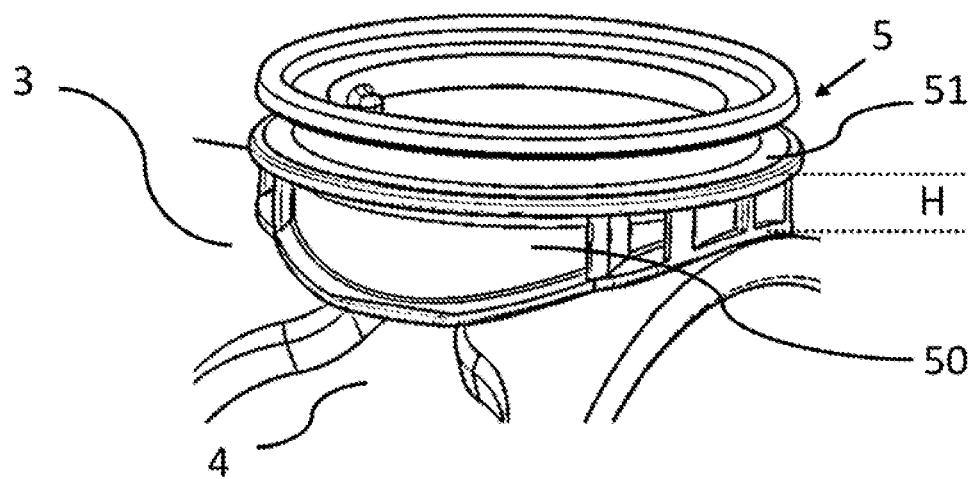
FIG. 2 shows a view of the solution according to the invention.
Figure 3:
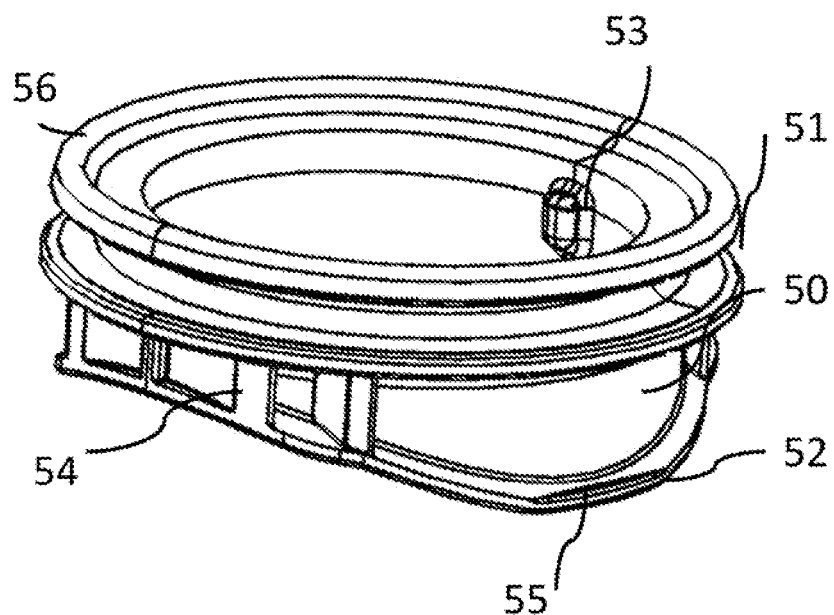
FIG. 3 shows a sliding seal according to the invention.
Figure 4:
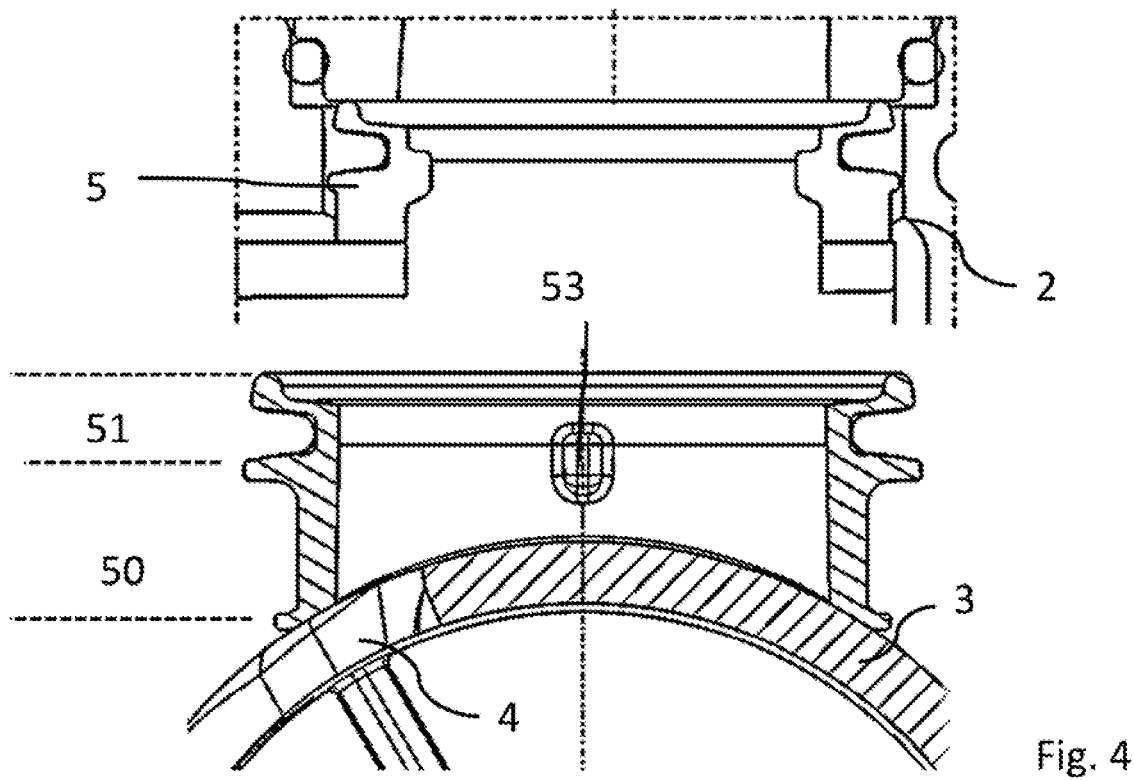
FIG. 4 shows a section through a sliding seal and a valve body.

FIG. 2 shows the valve body 3 in the region of one of the openings 4 of the valve body. The sliding seal 5 consists of two part regions, a moulded part 50 which runs in a manner which is adapted to the shape of the valve body, and a substantially cylindrical sealing part 51. The two part regions serve merely for an improved description of the sliding seal 5 which is a single-piece component. The moulded part 50 has different structural heights H, in order to be adapted in an optimum manner to the cylindrical outer face of the valve body 3.

The course of the structural heights becomes clear in FIGS. 6 and 7; here, the structural height H runs continuously from a lowest structural height H1 up to a greatest structural height H2.

The moulded part has a lower sealing face 52 and stiffening ribs 54 which extend from the lower sealing face 52 as far as the beginning of the sealing part 51.

Figure 5:
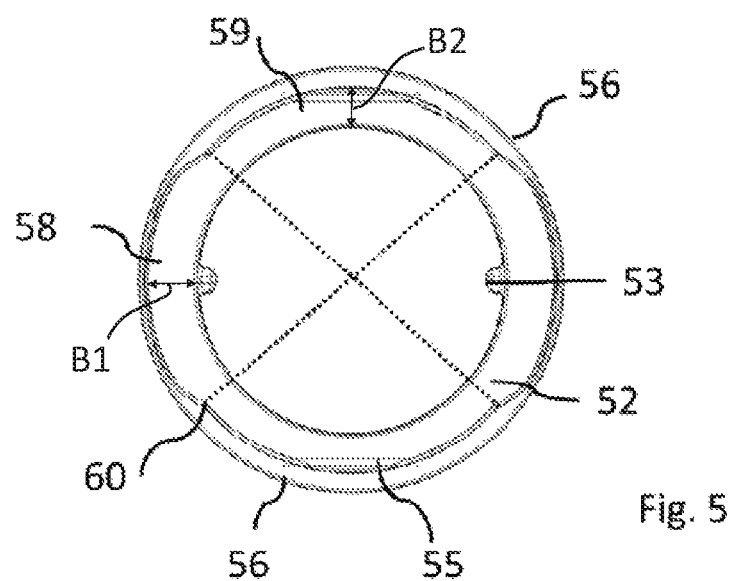
FIG. 5 shows a plan view of the sliding seal.

As can be seen in FIG. 5, the sliding seal is divided into different regions. The lower sealing face which is illustrated in the figure as a structure which runs within the circle of the upper sealing edge 56 can be divided into the sealing regions 58 of a first width B1 and regions 59 of a second width B2. The two widths B1 and B2 are configured differently. The transition between the widths B1 and B2 is brought about at points of the constriction 60. In the sealing regions 58 which have the greater width B1, the lower sealing face 52 always bears against the outer wall of the valve body and does not pass into the region of the openings of the valve body. In contrast, the sealing regions 59 with the smaller width B2 overlap the openings of the valve body.

In the sealing regions 58 of width B1, stiffening ribs 54 which consist of a material with high stiffness are introduced within the sliding ring.

The construction ensures satisfactory sealing properties by way of a uniform surface pressure between the sliding seal and the rotary valve.

In addition, hooking of the sliding seal 5 on the rotary valve has to be prevented. This takes place by virtue of the fact that the stiffening ribs 54 are arranged only in the sealing region 58 and not in the sealing region 59. Furthermore, the lower sealing face 52 has a chamfer 55 which is provided in the non-reinforced, elastic sealing region 59.

The chamfer 55 or flattened portion can be supported in the counterpiece (the valve body) by way of radii of the control slots.

There is a U-shaped or V-shaped groove, in which a spring 57 is arranged, in the sealing part 51 of the sliding seal. The axial force is introduced uniformly on the circumference as a prestressing force by way of the spring. The sealing part has a circular cross section which has an upper sealing edge 56. Furthermore, the sliding ring has lugs 53 which are used for correct positioning of the sliding ring during the assembly in a poka-yoke manner.

The sliding seal 5 is a single-piece component which is produced using injection moulding. Here, the stiffening structures are produced from a first material, and the elastic structures are produced from a second material. Here, the spring which is inserted is also overmoulded.

Multiple-component injection moulding allows inexpensive production and avoids further assembly steps for the sliding seal. The poka-yoke lugs determine the assembly position.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

LIST OF REFERENCE NUMERALS

1 Rotary valve
2 Housing
3 Valve body
4 Openings
5 Sliding seal
6 Inflow
7 Cover
10 Outflow
11 Aperture
50 Moulded part
51 Sealing part
52 Lower sealing face
53 Poka-yoke lug
54 Stiffening rib
55 Chamfer
56 Upper sealing edge
57 Spring
58 Sealing region of width B1
59 Sealing region of width B2
60 Constrictions
H Height
B Width

What is claimed is:

1. A sliding seal for enclosing an opening of a valve body of a rotary valve, the sliding seal comprising:
    a sealing part having a generally cylindrical shape and extending annularly about and along an axis;
    a moulded part extending annularly about the axis and extending axially from the sealing part to a lower sealing face for elastically engaging a surface of the valve body;
    the moulded part having a first region having a first radial width and extending to first axial height and a second region having a second radial width and extending to a second axial height, wherein the second axial height is greater than the first axial height; and
    the moulded part further having at least one stiffening rib located at the first region.

2. The sliding seal as set forth in claim 1, wherein the first radial width of the first region is greater than the second radial width of the second region.

3. The sliding seal as set forth in claim 1 wherein the at least one stiffening rib has a height that matches the first height of the first region of the molded part.

4. The sliding seal as set forth in claim 1 wherein the lower sealing face of the moulded part slopes from the first axial height of the first region to the second axial height of the second region.

5. The sliding as set forth in claim 1 wherein the at least one stiffening rib includes a plurality of stiffening ribs being spaced from one another along the first region.

6. A rotary valve, comprising a housing with a valve chamber having at least one inlet and at least one outlet, wherein at least one of the inlet and the outlet are at least partially closable by a valve body which is rotatable about an axis and is arranged in the valve chamber, wherein, on a side of the housing facing the valve body, at least one of the inlet and the outlet is enclosed by a sliding seal, wherein the sliding seal bears sealingly, under elastic preload, against a surface of the valve body facing the housing, wherein the sliding seal includes a sealing part and a moulded part, the moulded part having sealing regions of different stiffness, the sealing regions including a first region having a first radial width and a second region having a second radial width, wherein the first region extends to a first axial height and the second region extends to a second axial height, wherein the second axial height is greater than the first axial height, and wherein at least one stiffening rib is located at the first region.

7. The rotary valve according to claim 6, wherein the at least one stiffening rib has a height that matches the first height of the first region of the moulded part.

8. The rotary valve according to claim 6, wherein the first radial width of the first region is greater than the second radial width of the second region.

9. The rotary valve according to claim 6, wherein the second region has a chamfer.

10. The rotary valve according to claim 6, wherein the sealing part contains a spring in a U-shaped groove.

11. The rotary valve according to claim 6, wherein the sliding seal is producible by plastics injection moulding from at least two plastics of different stiffness.

12. The rotary valve as set forth in claim 6 wherein the at least one stiffening rib includes a plurality of stiffening ribs being spaced from one another along the first region.

* * * * *